United States Patent [19]
Datskos et al.

[11] Patent Number: 5,977,544
[45] Date of Patent: Nov. 2, 1999

[54] UNCOOLED INFRARED PHOTON DETECTOR AND MULTICOLOR INFRARED DETECTION USING MICROOPTOMECHANICAL SENSORS

[75] Inventors: Panagiotis G. Datskos; Solobodan Rajic; Irene C. Datskou, all of Knoxville, Tenn.

[73] Assignee: Lockheed Martin Energy Research Corporation, Oak Ridge, Tenn.

[21] Appl. No.: 08/901,802

[22] Filed: Jul. 28, 1997

[51] Int. Cl.[6] .................................................. G01J 1/56
[52] U.S. Cl. ................................ 250/338.1; 250/338.4; 250/349; 250/370.01; 73/774; 356/32
[58] Field of Search ........................... 250/338.1, 338.4, 250/339.01, 339.03, 339.02, 349, 352, 370.01, 370.06, 370.13, 370.15, 371; 73/774, 655; 356/32

[56] References Cited

U.S. PATENT DOCUMENTS

| | | | |
|---|---|---|---|
| 3,887,937 | 6/1975 | Gatos et al. | 250/231.1 |
| 4,252,440 | 2/1981 | Fedors et al. | 356/32 |
| 4,912,355 | 3/1990 | Noel et al. | 73/774 |
| 5,103,682 | 4/1992 | Moreland et al. | 73/862.61 |
| 5,747,698 | 5/1998 | Spillman, Jr. et al. | 73/774 |

OTHER PUBLICATIONS

F.J. von Preissing, "Applicability of the classical curvature–stress relation for thin films on plate substrates," J. Appl. Phys., vol. 66, No. 9, Nov. 1, 1989 pp. 4262–4268.

R.G. Stearns and G.S. King, "Effect of electronic strain on photoacoustic generation in silicon," Appl. Phys. Lett. 47 (10) Nov. 15, 1985 pp. 1048–1050.

T. Figielski, "Photostriction Effect in Germanium," Phys. Status Solidi 1, pp. 306–316 (1961).

P.G. Datskos, P.I. Oden, T. Thundat, E.A. Wachter, R.J. Warmack, and S.R. Hunter, "Remote infrared radiation detection using piezoresistive microcantilevers," App. Phys. Lett. 69, p. 2986 (Sep. 17, 1996).

Primary Examiner—Constantine Hannaher
Assistant Examiner—Darren M. Jiron
Attorney, Agent, or Firm—Jones & Askew, LLP

[57] ABSTRACT

Systems and methods for infrared detection are described. An optomechanical photon detector includes a semiconductor material and is based on measurement of a photoinduced lattice strain. A multicolor infrared sensor includes a stack of frequency specific optomechanical detectors. The stack can include one, or more, of the optomechanical photon detectors that function based on the measurement of photoinduced lattice strain. The systems and methods provide advantages in that rapid, sensitive multicolor infrared imaging can be performed without the need for a cooling subsystem.

59 Claims, 7 Drawing Sheets

UNCOOLED INFRARED PHOTON DETECTOR AND MULTICOLOR INFRARED DETECTION USING MICROOPTOMECHANICAL SENSORS

STATEMENT AS TO RIGHTS TO INVENTIONS MADE UNDER FEDERALLY-SPONSORED RESEARCH AND DEVELOPMENT

This invention was made with United States government support awarded by the United States Department of Energy under contract to Lockheed Martin Energy Research Corporation. The United States has certain rights in this invention.

BACKGROUND OF THE INVENTION

1. Field of the Invention

The present invention relates generally to the field of photon sensing. More particularly, the present invention relates to an optomechanical photon detector and a multicolor sensor that can incorporate this detector. Specifically, a preferred implementation of the present invention relates to a multicolor infrared sensor that is based on a stack of frequency specific optomechanical photon detectors, each of which operates based on measurement of photoinduced lattice strain. The present invention thus relates to infrared sensors of the type that can be termed multicolor.

2. Discussion of the Related Art

Detecting photons, especially infrared photons, is a challenging endeavor. There are two types of infrared radiation detectors currently used: photon detectors and thermal detectors.

Infrared photon detectors are usually based on semiconductor materials. Their operation is based on the conversion of photon energy to charge carriers. As is well known, these charge carriers include electrons and/or holes. These charge carriers can be detected as current or voltage. Some photon detectors can attain detectivities of approximately $10^{13}$ cm Hz$^{1/2}$/W but require the device to be cooled in order to minimize the dark current that interferes with the signal to be measured. However, this cooling requirement increases the complexity and cost of such devices.

Infrared thermal detectors are based on the conversion of photon energy to heat which results in temperature induced changes in the detector. The temperature of the detector is measured. This requires the device to have high thermal isolation. In addition, to maximize their sensitivity, their response times are unacceptably slow, on the order of a few milliseconds. Heretofore, these two factors have represented major obstacles to the wider implementation of thermal detectors as infrared imagers. The theoretical detectivity of thermal detectors is on the order of approximately $10^{10}$ cm Hz$^{1/2}$/W at room temperature. A value for detectivity of approximately $10^9$ cm Hz$^{1/2}$/W has already been demonstrated in this temperature regime.

What is needed, therefore, is an improved approach to infrared sensing that has high detectivity, but does not require cooling. What is also needed is an improved approach to infrared imaging that provides both a multicolor capability and a rapid response time. Heretofore, these requirements have not been met.

Within this application several publications are referenced by superscripts composed of Arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

SUMMARY OF THE INVENTION

Therefore, there is a particular need for a solid state optomechanical photon detector that is based on measurement of the lattice strain that is induced by increased an charge carrier concentation resulting from a change in the bandgap $\epsilon_g$ of a semiconductor material. These optomechanical photon detectors can respond to the presence of a small number of photons with increased sensitivity and speed, and are not limited by the so-called dark current that plagues other solid state photon detector devices. Furthermore, unlike conventional photon infrared detectors, these optomechanical photon detectors do not require operation at low temperatures.

In addition, there is a particular need for a graduated stack of optomechanical photon or thermal detectors that can sense multiple colors in a spectral signal by rapidly responding in different ways to photons of specific wavelength bands. The upper detector(s) in such a stack absorb (and detect) photons having the shortest wavelengths. Nonabsorbed photons (longer wavelengths) pass through the upper detector(s) in the stack and can therefore be resolved as one or more distinct colors by the lower detector(s) in the stack. Such a stack can include as few as two detectors and still provide a degree of rapid color sensitive imaging.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the components and operation of model systems provided with the present invention, will become more readily apparent by referring to the exemplary, and therefore nonlimiting, embodiments illustrated in the drawings accompanying and forming a part of this specification. It should be noted that the features illustrated in the drawings are not necessarily drawn to scale.

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well-known components and processing techniques are omitted so as not to unnecessarily obscure the present invention in detail.

Optomechanical Photon Detector

In a semiconductor the generation of free charge carriers (electrons and holes) via photon irradiation results in the development of a local mechanical strain. [1,2] This effect will either increase or decrease the lattice parameter(s) in an irradiated semiconductor crystal. This additional strain is more significant than other induced strains, (e.g., strains induced from temperature changes). When the photon flux is high enough, detection can even be accomplished with photo-acoustic techniques.[3]

An optomechanical photon detector according to the present invention utilizes the above-discussed semiconductor effect, namely the change in band gap energy and the induced lattice strain due to changes in charge carrier concentration. An optomechanical photon detector according to the present invention does not require cooling because thermally generated carriers can be eliminated from the operation of the detector.

Figure 1:
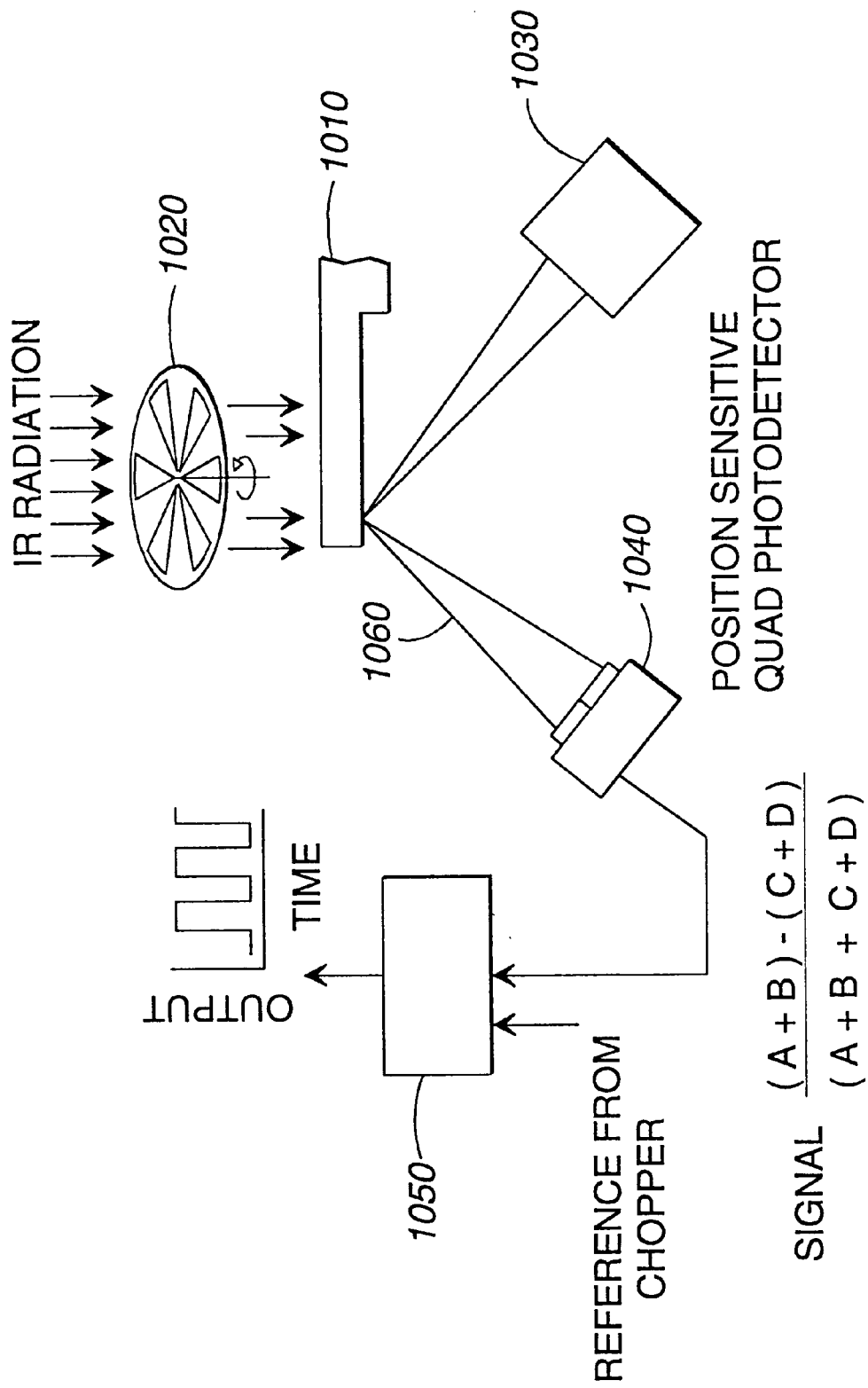
FIG. 1 illustrates a schematic view of an optical detection method for determining the deflection of a silicon microbar, representing an embodiment of the present invention.

Referring to FIG. 1, an optomechanical detector 1010 exhibits lattice strain when it is illuminated by infrared radiation through a chopper 1020. This strain (deformation) is measured by an instrument assembly that includes a diode laser 1030, a position sensitive quad photodetector 1040 and a digital oscilloscope 1050. This measurement assembly will be discussed below in more detail and is only one of many different ways to characterize the deformation of the optomechanical detector 1010. For example, if the detector can be formed in the shape of a microcantilever (as shown in FIG. 1) then the photoinduced strain can be determined by a number of techniques, including optical, capacitive, piezoresistive, and electron tunneling.

The theory of operation of the optomechanical photon sensor will now be discussed in some detail. The optomechanical photon sensor device accomplishes the infrared photon sensing in the following manner: free charge carriers (electrons, holes) generated when photons interact with a semiconductor structure give rise to a lattice strain (called photoinduced strain) which in turn results in measurable (and reversible) deformation of the semiconductor structure. This photoinduced deformation can be termed photoinduced strain. This photoinduced strain is orders of magnitude faster than strain due to thermal effects. Further, this photoinduced strain can be orders of magnitude larger than strains due to thermal effects.

Figure 2A:
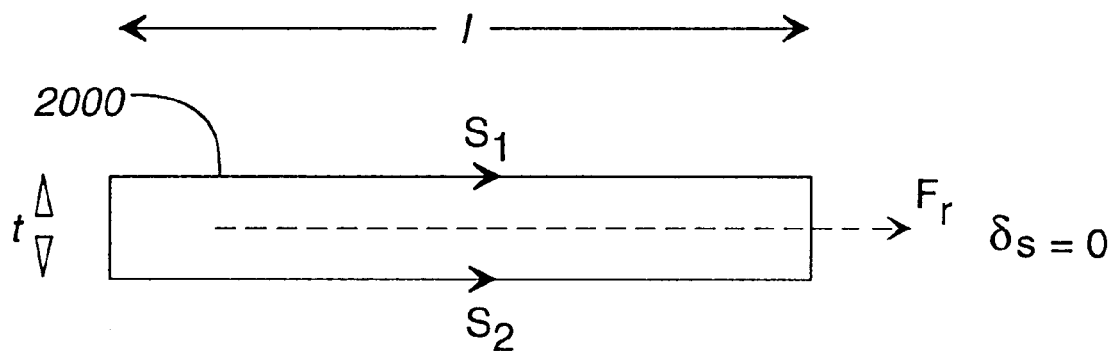
FIGS. 2A and 2B illustrate schematic views of an optomechanical photon detector, representing an embodiment of the present invention.
Figure 2B:
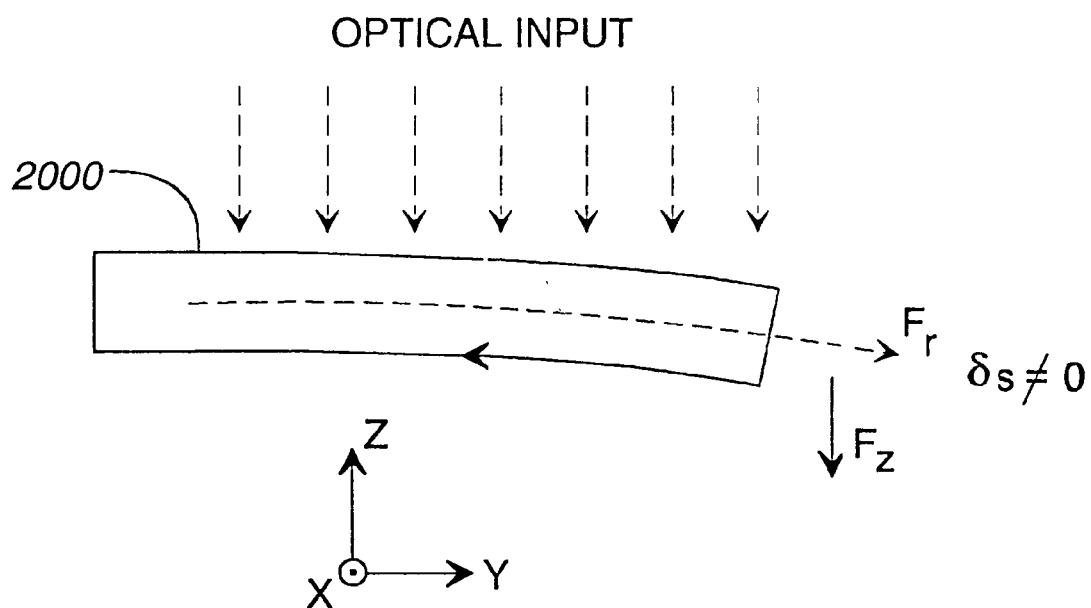

Referring to FIGS. 2A and 2B, an optomechanical photon detector 2000 has a length l and a thickness t. The total change in strain due to changes in charge carrier concentration, $\Delta n$, and temperature changes $\Delta T$ is the sum of the change in the photo-induced strain, $\delta S_{pi}$, and thermal strain, $\delta S_{th}$, expressed by $$\delta s = \delta s_{pi} + \delta s_{th} = \left(\frac{1}{3}\frac{d\epsilon_g}{dP}\Delta n + \alpha \Delta T\right) \quad \text{Eq. (1)}$$

where, $\epsilon_g$ is the energy band gap, P is the induced pressure and $\epsilon$ is the coefficient of thermal expansion.[1,2] A hole (in the valence band) decreases the energy of covalent bonds while an electron adds to the bonding or antibonding energy. Therefore, depending on the sign of $d\epsilon_g/dP$ (which can be either positive or negative), there can be a competing effect between the photo-induced strain and the thermal strain.

The change in $\Delta n$ in a semiconductor (with dimensions of length l, width w, and thickness t), caused by a photon flux, can be expressed as $$\Delta n = \eta \frac{\Delta \phi T_L}{lwt} \quad \text{Eq. (2)}$$

where $\eta$ is the quantum efficiency, $\Delta\phi$ is the number of photons per unit time, and $T_L$ is the excess carrier lifetime in the semiconductor; $T_L$ is usually approximately $10^{-4}$ seconds. This relationship assumes that $\Delta n$ is solely due to signal photons having a lifetime $T_L$, in the detector volume lwt, where (as noted above) l is length, w is width, and t is thickness.

Figure 3:
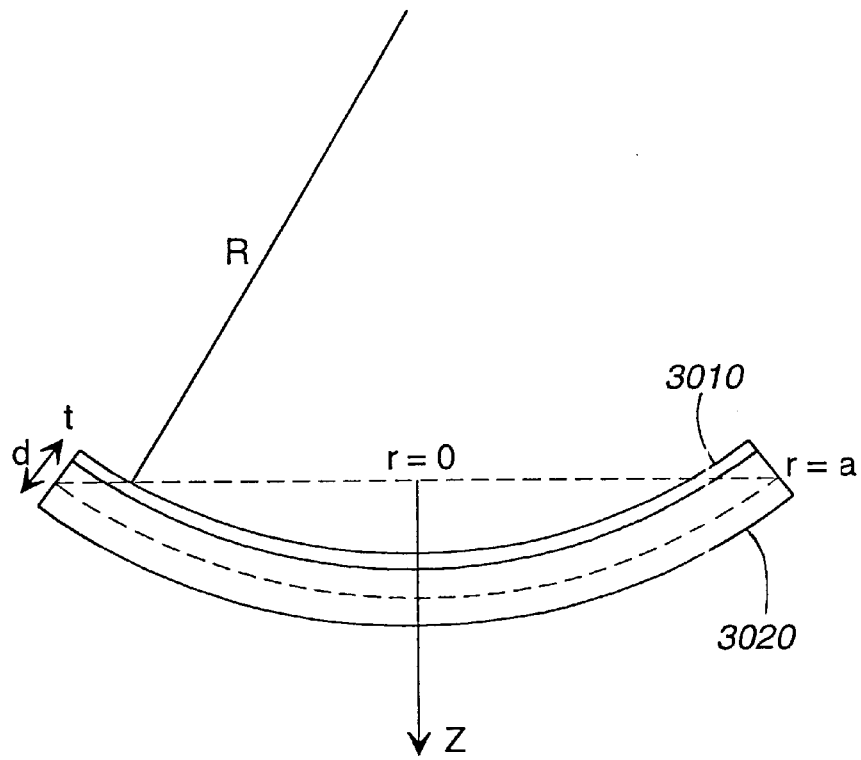
FIG. 3 illustrates a schematic view of a bent circular plate of thickness t (with a thin semiconductor film of thickness d showing the radius of curvature), representing an embodiment of the present invention.

Referring to FIG. 3, a circular plate including a thin film 3010 of thickness t on a substrate 3020 with thickness d at a constant temperature will have a radius of curvature given by $$\frac{1}{R} = \frac{6(1-u)t}{d^2}\left(\frac{1}{3}\frac{d\epsilon_g}{dP}\Delta n\right) \quad \text{Eq. (3)}$$

where, u is the Poisson's ratio. Hence, by measuring the radius of curvature of such a film exposed to infrared photons (e.g., by an optical or a capacitive technique) film strain can be measured which in turn will allow the determination of $\Delta n$ and thus detect the infrared photons.

Since (as noted above) the quantity $d\epsilon_g/dP$ can take either positive or negative values depending on the semiconductor crystal chosen, the deflection of a such a substrate can either be in the same or opposite direction from the thermally induced deflection. Thus, in micro instrumentation situations where (for example) silicon is used as the experiment substrate, the semiconductor can be engineered to compensate for the thermal deflection with an equal and opposite photon induced deflection. Thus, under the designed conditions there would be no net distortion of such a substrate. This could have a great impact in certain sensor, microoptical bench, and orbiting satellite instrument applications. In the latter example, (reflected) solar energy would be the source for both thermal and photon induced deflection in a satellite subsystem. Thus, the subsystem would be appropriately engineered and produce no net deflection whether illuminated or shaded.

The charge carriers are generated in a very short time and can have lifetimes of up to tenths of microseconds.

Therefore, the response time for the optomechanical photon detector is very rapid and can be as low as a few nanoseconds. Of course, this mechanism is only important when the photon energy is larger than the bandgap of the semiconductor material whose strain is being measured. An efficient uncooled infrared photon detector can be constructed using semiconductor materials with small bandgaps (e.g., $\epsilon_g < 0.1$ eV) such as, for example, HgCdTe. Compared to thermal detectors that respond to impinging photons by a purely thermal effect, devices in accordance with the invention will respond more sensitively and rapidly.

A number of semiconductor materials can be used in the implementation of the invention. For example, HgCdTe layers with different composition will exhibit different cutoff wavelengths, which can be tailored to the correct wavelength region.

Although the term semiconductor implies crystalline materials, the invention can be implemented with amorphous semiconductor materials, such as, for example, amorphous silicon. The electron scattering properties of amorphous silicon occur in a timeframe of milliseconds and do not disrupt the carrier induced lattice strain before the lattice strain can be measured.

Other more attractive materials include extrinsic silicon structures. For example, Si:In has a cutoff wavelength around 8 microns and can be used as a detector for infrared radiation below 8 microns. Si:Ga and Si:As semiconductor materials have, cutoff wavelengths of approximately 19 microns and approximately 23 microns, respectively. The combination of these materials in a single sensor provides the opportunity to create a color infrared detector pixel. A device based on this invention will achieve multicolor infrared detection by combining multiple stacked (e.g., two, or preferably three or more) detection elements. The detection elements can be made out of semiconductors shaped in the form of a microbridge, microbar, or microplate, where each detection element has a different cutoff wavelength.

However, the particular material selected for the optomechanical photon detector is not essential to the present invention, as long as it provides the described function. Normally, the makers of the invention will select the best commercially available material based upon the economics of cost and availability, the expected application requirements of the final product, and the demands of the overall manufacturing process.

Optical Measurement of Strain in an
Optomechanical Photon Detector

Referring again to FIG. 1, an optical detection technique can be employed to determine the bending of microstructures. In this scheme, the location of a HeNe laser beam 1060 (reflected off the microstructure) is detected using a continuous position sensitive photodiode 1040 (usually a quad cell with elements: A, B, C, and D) and the bending of the microcantilever 1010 causes a linear variation in the current outputs ($i_{A,B,C,D}$) of the photodiodes. (Only two of the four photodiodes are visible in FIG. 1; the other two are behind the first two and are not visible in the orthographic view.) A high narrow bandpass optical filter (not shown) can be placed in front of the photodiodes allowing the HeNe laser beam 1060 to be detected while preventing other wavelengths from reaching the photodiodes. The amplified differential current signal from the quad cell photodiode $i_{A,B,C,D} = [\{(i_A+i_B)-(i_C+i_D)\}/(i_A+i_B+i_C+i_D)]$, is monitored and recorded with the digital oscilloscope 1050 and a lock-in amplifier. This optical detection scheme of microcantilever bending and resonance frequency is similar to the technique employed in scanning force microscopy imaging systems. This technique is relatively easy to use, has low noise interference and has the potential of measuring extremely small deflections of the microcantilever, (e.g., on the order of approximately $<10^{-14}$ meters).

Tunneling Detection of Strain in an
Optomechanical Photon Detector

Figure 5:
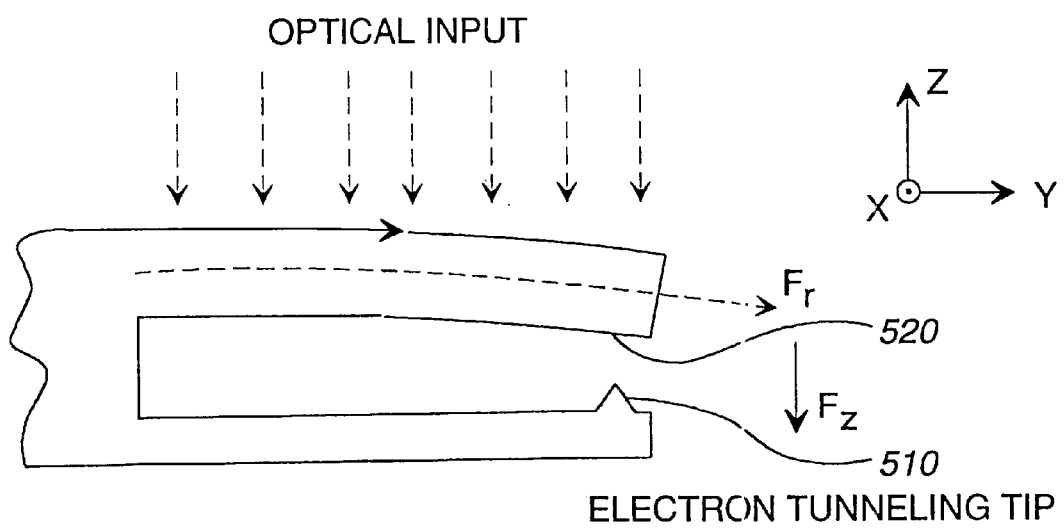
FIG. 5 illustrates a schematic view of an electron tunneling detection method for determining the deflection of a silicon microbar, representing an embodiment of the present invention.

Referring to FIG. 5, the motion of the strain exhibiting microstructure can be measured using an electron tunneling detection technique. As in scanning tunneling microscopy, electrons are detected which can tunnel through the classically forbidden barrier between a sharp tip 510 and a surface 520. The electron current has an exponential dependence on the distance between the tip 510 and the surface 520. When biased at a given voltage, the tunneling current between the substrate (surface 520) and the tip 510 is given by $$i = i_0 e^{-\beta\sqrt{\Phi_0 d}} \qquad \text{Eq. (4)}$$

Where $\beta$ is a conversion factor, $\Phi_0$ is the potential barrier height and d is the distance between the tip 510 and the substrate 520.

Capacitive Detection of Strain in an
Optomechanical Photon Detector

The photoinduced lattice strain can be characterized by measuring the capacitance of a device that includes a "ground plate" and a semiconductor material as the other "plate." As the semiconductor material is deformed due to charge carrier induced lattice strain, the gap between the "plates" changes. Of course, the capacitance of the device is a function of the size of the gap. A sensitive multimeter connected to the "ground plate" and the detector "plate" can be used to measure the change in capacitance (change in gap) that results from the photoinduced induced lattice strain in the semiconductor material.

Figure 6:
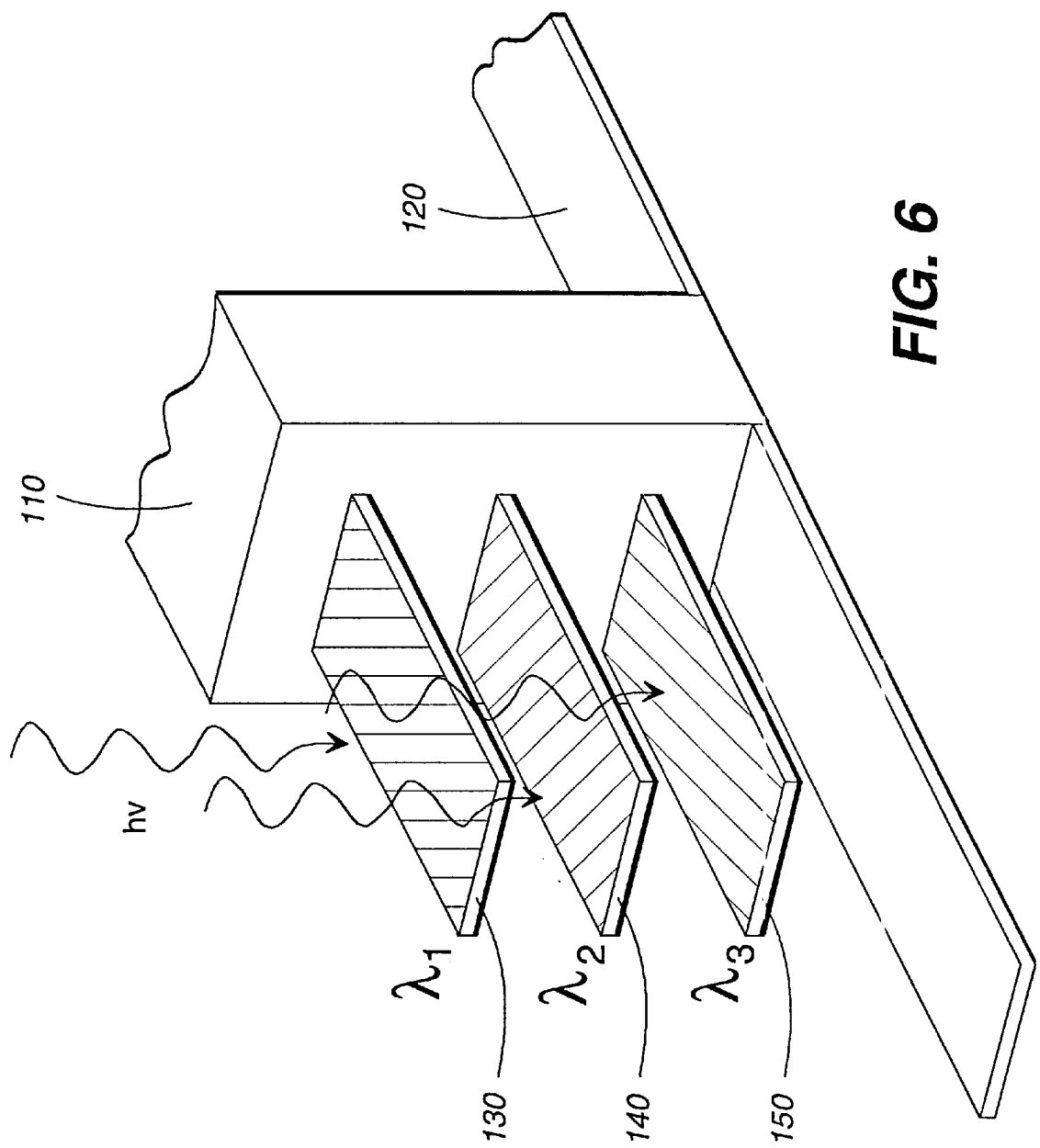
FIG. 6 illustrates a perspective schematic view of a multicolor sensor, representing an embodiment of the present invention.

Referring to FIG. 6, capacitive based detection may be particularly suitable for a sensor combination that includes a stack of detectors. For example, referring to FIG. 6, first the capacitance of the lower sensing element (detector 150 labeled $\lambda_3$) to the ground plane (substrate 120) could be measured. Then, the capacitance of the second sensing element (detector 140 labeled $\lambda_2$) together with the lower element (detector 150) to the ground plane (substrate 120) could be measured and so on. In this way the actual bending of any of the detector structures in FIG. 6 can be determined accurately. The sensor illustrated in FIG. 6 will be described in more detail in the section on multicolor sensors below.

EXAMPLE

A specific embodiment of the optomechanical photon detector will now be further described by the following, nonlimiting example which will serve to illustrate in some detail various features of significance. The example is intended merely to facilitate an understanding of ways in which the present invention may be practiced and to further enable those of skill in the art to practice the present invention. Accordingly, the example should not be construed as limiting the scope of the present invention.

A study was performed on the effect of photo-induced stress on silicon microcantilevers with dimensions of l=100 microns, w=20 microns, and t=1 micron. An optical readout technique was used to observe the bending of a semiconductor structure exposed to IR radiation. The approach employed was adapted from atomic force microscope AFM imaging systems.

Referring again to FIG. 1, the experimental setup used can be seen. A microcantilever (detector 1010) was exposed to near infrared photons from the diode laser 1030 with a wavelength of $\lambda=780$ nm. A micromechanical chopper 1020 is used to modulate the infrared radiation. The micromechanical chopper 1020 comprises a rotating wheel having a plurality of apertures. When a solid section of the wheel rotates into alignment with the beam, the radiation is blocked, and when an aperture rotates into alignment with the beam of infrared radiation, radiation passes and strikes the detector 1010. The frequency of the beam of infrared radiation striking the detector 1010 is thus modulated by controlling the speed of rotation of the wheel and the number of apertures in the wheel. Using the mechanical chopper 1020, the infrared radiation was modulated at a frequency of 1000 Hz.

Figure 4:
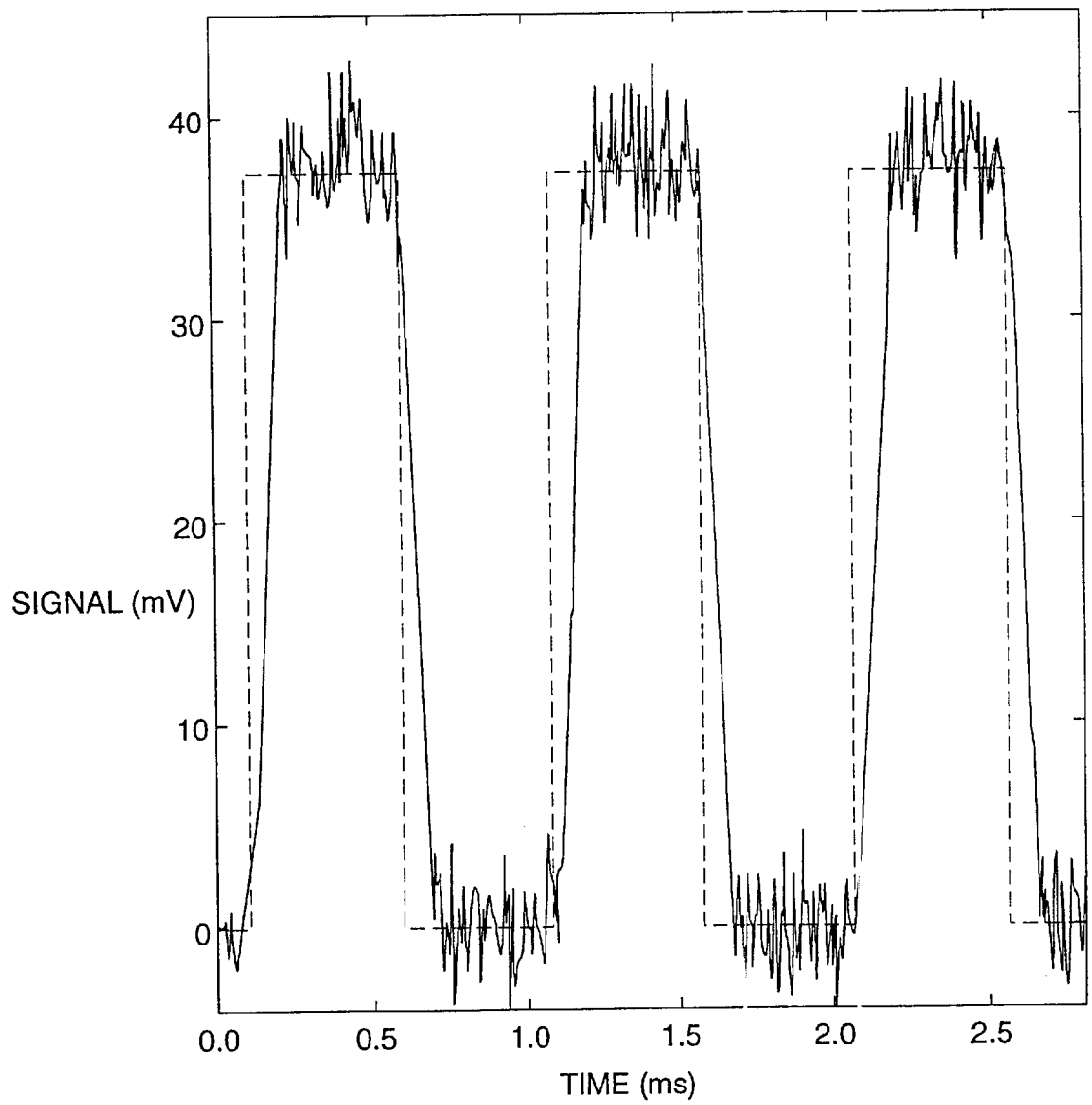
FIG. 4 illustrates strain as a function of time for an optomechanical photon detector exposed to a modulated infrared source, representing an embodiment of the present invention.

Referring now to FIG. 4, the bending of the silicon microcantilever exposed to these near infrared photons is plotted and shows the deflection of the silicon member (solid curve) due to photogenerated charge carriers. The dashed curve represents the signal from the modulator and shows the amount of time the detector was exposed to photons. The fast response is comparable to photon detection mechanisms and faster than thermal detection effects.

Still referring to FIG. 4, the silicon microcantilever responds rapidly to incoming photons that generate charge carriers which, in turn, causes a measurable mechanical bending. In this experiment, photons continued to impinge on the detector surface for approximately $5 \times 10^{-4}$ seconds while the bending reached its maximum value in approximately $1 \times 10^{-4}$ seconds. The time that the microcantilever reached its maximum bending corresponds nicely to the lifetime of the photogenerated "free" charge carriers in the silicon. For a similar structure, thermal effects have been found to play a role in a slower time scale and have a time constant of greater than $10^{-3}$ seconds.

Silicon has a negative $d\epsilon_g/dp$ value. It is straightforward to separate the photo-induced from the thermal effect by observing the direction of bending. When photons with $\lambda=780$ nm were used, the silicon beam was observed to contract and deflect in one direction. However, when photons with $\lambda=1300$ nm were used the silicon beam expanded and deflected in the opposite direction. The fast response of the microcantilever photon detector (FIG. 4) is comparable to other photon detection mechanisms and faster than deflections due to thermal effects. The results demonstrate that the mechanism presented is valid for Silicon when the photons have energies above the silicon bandgap energy. In addition, these results show that such a mechanism can be used to detect near infrared photons using a silicon microcantilever.

Multicolor Sensors

A multicolor sensor system according to the invention also utilizes the interaction of photons with matter. This system is based on a stack of detectors, where each detector responds only to a particular photon wavelength region.

As photons impinge on the stack, they encounter a first detector at the top of the stack. This first detector responds to (absorbs) shorter wavelengths (has a shorter cutoff wavelength) than the rest of the stacked detectors. In this way, short wavelength photons will be absorbed in the first detector and will not reach the rest of the stacked detectors below. However, photons with longer wavelengths will be transmitted through the first detector. These longer wavelength photons will be absorbed by one of the subsequent detectors (located below the first sensor) wherein the photons will have the appropriate wavelength response. In this manner, only less energetic photons will be able to pass through the outer detectors and be detected by one of the inner detectors. Therefore, the response of each detector element will be due to its interaction with photons within a given wavelength range. For each detector, this interaction can be interpreted (characterized) as a separate color. The number of colors that can be resolved by a given sensor depends on the number of stacked detectors. As discussed below in more detail, this multicolor sensing approach can be implemented with optomechanical infrared detectors that operate either as photon detectors or as thermal detectors.

Referring again to FIG. 6, a multicolor infrared sensor assembly 110 is mounted on a substrate 120. As noted above, the substrate 120 can be termed a ground plane. The sensor assembly 110 includes a first detector 130, a second detector 140, and a third detector 150. It should be noted that the assemblies can include from two to any number of detectors and that the assemblies can be laterally combined to form an n×m array. Such an array would be particularly usefull in imaging implementations. Each of the sensors 130, 140 and 150 is an infrared optomechanical detector element. The detectors 130, 140, and 150 compose a stack of detectors. The detectors 130, 140, and 150 are advantageously separated by a fixed distance.

As photons having a range of energies (hv) impinge on the detector assembly 110, they encounter the first (top) detector 130 which responds in a wavelength region $\lambda_1$ that spans shorter wavelengths, compared to the rest of stacked optomechanical detectors 140 and 150. Therefore, photons with wavelengths in the absorption region of the top detector 130, ($\lambda_1$) will be absorbed and will not reach the rest of the stacked detectors. On the other hand, photons with longer wavelengths ($\lambda_2$ and $\lambda_3$) that are outside the absorption region of the first (top) detector will be transmitted through the first detector and be absorbed by one of the lower detectors that has the appropriate wavelength response. In this way, only less energetic photons will be able to pass through the outer (upper) detectors and therefore be detected by one of the inner (lower) detectors.

If the detectors in the sensor assembly 110 are optomechanical photon detectors, it can be appreciated that the first (top) detector element 130 will have the shortest cutoff wavelength (largest bandgap) compared to the other two detectors 140 and 150. This will allow longer wavelength photons to penetrate and impinge on the subsequent detectors 140 and 150. However, the wavelength region of different detectors may have overlapping regions.

If the detectors in the sensor assembly 110 include one or more optomechanical thermal detectors, each sensing element (detector) in the stack can be coated with a layer that exhibits photon absorption in different wavelength regions. For example, if three detecting elements are used, the top detector could be coated with a layer that absorbs photons with wavelengths below 5 microns, the second detector could be coated with a layer that absorbs photons with wavelengths below 10 microns and the third detector could be coated with a layer that absorbs photons with wavelengths below 14 microns. Regardless of the specific wavelengths chosen, the optomechanical thermal detector approach will measure the temperature induced strain in the detectors. This strain can be measured using the same optical, tunneling and capacitive techniques described above.

Figure 7:
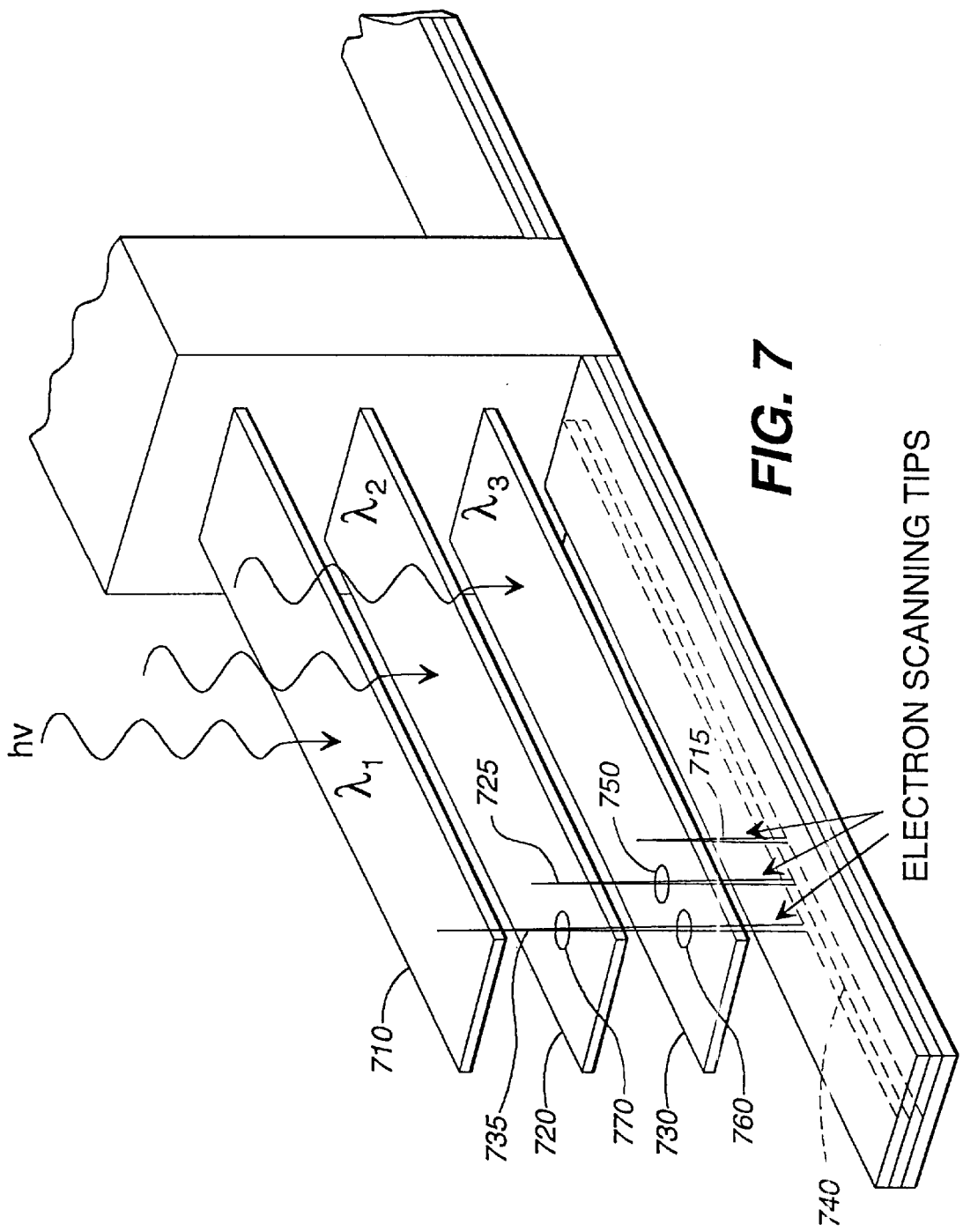
FIG. 7 illustrates a perspective schematic view of a multicolor sensor with an array of electron tunneling tips, representing an embodiment of the present invention.

Referring to FIG. 7, the individual strains in a stack of detectors 710 ($\lambda_1$), 720($\lambda_2$) and 730 ($\lambda_3$) can be monitored using an array of electron scanning tips 740. The array of electron scanning tips 740 includes a first tip 715 that is in tunneling engagement (very close) with detector 730. The array of electron scanning tip 740 includes a second tip 725 that passes through a hole 750 in detector 730 and is in tunneling engagement with detector 720. The array of electron scanning tip 740 includes a third tip 735 that passes through a hole 760 in detector 730, through a hole 770 in detector 720 and is in tunneling engagement with detector 710.

Temperature Tuning of Optomechanical Photon Detectors

Turning now to a different subject, the bandgap energy in semiconductor materials can be varied with temperature. Typically the bandgap decreases with an increase in temperature. Therefore, a given detector can be heated to shift the cut-off to a lower energy level and allow a band of slightly longer wavelength photons to be detected by that detector. This effect is reversible so that when the detector is subsequently cooled, photons with wavelengths within the band would again pass through that detector. However, under both conditions, significantly longer wavelength photons would always pass through that detector to the subsequent detector (next color level). Each detector in a stack could then act as a variable threshold cut-off filter, thereby yielding better resolution. Further, some resolution of color would be possible with a single detector. Given a detector material wherein the bandgap increases with increasing temperature (e.g., PbS), an upfield cut-off shift could be obtained by heating the detector.

Shuttering of Optomechanical Detectors

Figure 8:
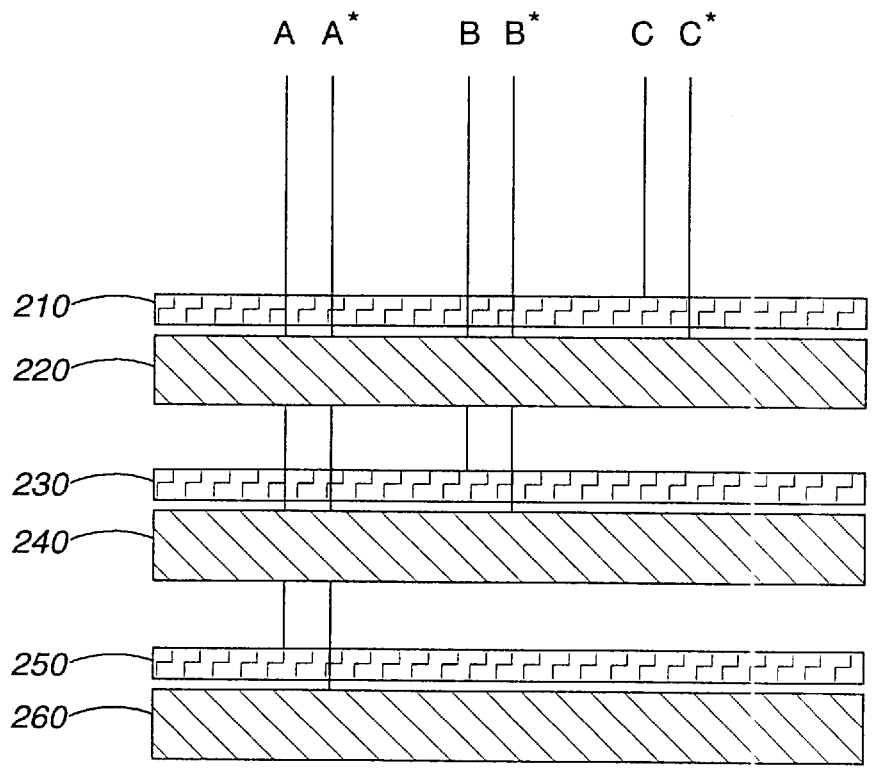
FIG. 8 illustrates a schematic view of a multicolor infrared sensor with electronically activated shutters, representing an embodiment of the present invention.

Referring to FIG. 8, an additional microstructure can be added above each color sensitive element (optomechanical photon or thermal detector) that would act as a shutter. A first electronically activated shutter 210 is located above a first active detector element 220 (shortest wavelength). A second electronically activated shutter 230 is located above a second active detector element 240 (intermediate wavelength). A third electronically activated wavelength selective shutter 250 is located above a third active detector element 260 (longest wavelength). The letters in FIG. 8 correspond to photon wavelengths that are blocked by one of the shutters 210, 230, or 250 and the corresponding asterisk labeled letters correspond to the absorbed photons at that particular wavelength step. To prevent the heating of the active color pixel associated with the shutter, a synchronized short duty cycle modulated signal could be used to achieve the desired shuttering effect in any or all color wavelengths.

Hybrid Junction/Optomechanical Detector

Combining a junction detector with an optomechanical detector can provide a hybrid detector. The junction detector can be either a PN junction or a metal-semiconductor junction. PN junctions may be better for visible photon detection. Metal-semiconductor junctions may be better for very near IR photon detection. The optomechanical detector can be either an optomechanical photon detector (charge carrier induced lattice strain) or an optomechanical thermal detector (thermally induced strain). The junction detector could also be combined with a classical thermal detector.

Figure 9:
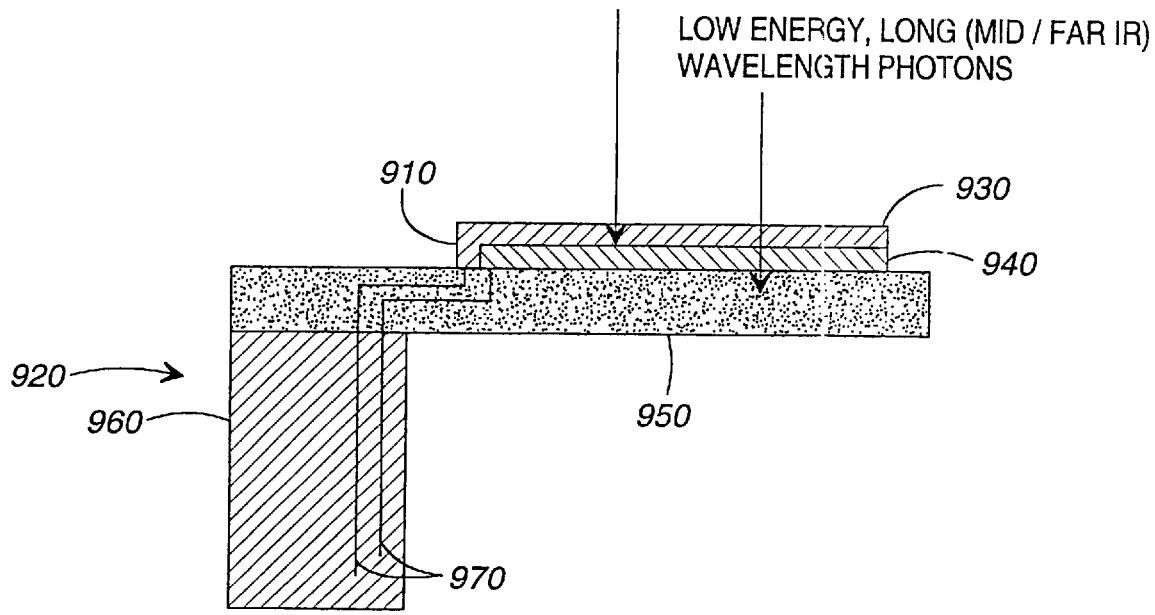
FIG. 9 illustrates a schematic view of a hybrid PN/optomechanical thermal detector, representing an embodiment of the present invention.

Referring to FIG. 9, a PN junction 910 can be provided on a thermal detector microstructure 920 to form a hybrid pixel. The junction 910 can be optimized to detect high energy, short (visible/near IR) wavelength photons. In the illustrated embodiment, a P type layer 930 is deposited on top of an N type layer 940. The resulting junction 910 is located on top of an optomechanical IR thermal detector 950. The detector 950 can be optimized to detect low energy, long (mid/far IR) wavelength photons. The combined detector is supported in a cantilever configuration by a support 960. A pair of electrical readout terminals 970 is connected to junction 910 through detector 950 and support 960.

Thus, depending on the energy/temperature of the target/source the photon detector (approximately 1 nanosecond rise time) could be a trigger for the thermal detector which although slower would be more efficient at the farther IR wavelengths. However, this hybrid design would also inherently be a multicolor detector since the thermal detector would respond to longwave IR and the silicon photon detector would only respond to very near IR wavelengths.

Practical Applications of the Invention

A practical application of the present invention that has value within the technological arts is in military thermal imaging. The present invention is useful in conjunction with medical imaging techniques, either internal or external, such as those used to detect cancer. Further, the present invention is useful in conjunction with other thermal imaging applications, such as those used for the purpose of law enforcement, or for the purpose of civilian transportation safety applications, or the like. There are virtually innumerable uses for the present invention, all of which need not be detailed here.

Advantages of the Invention

Detectors and/or sensors, representing implementations of the invention, are cost effective and advantageous for at least the following reasons. First of all, the present invention can eliminate the need for expensive cooling, thereby reducing the cost of the system by approximately two orders of magnitude. Since the change in excess charge carriers is not sensed as an increase in the photoconductivity, the present invention does not require the cooling that is needed by conventional photo detectors to eliminate the thermally generated carriers. Similarly, the present invention does not require the thermal isolation that is necessary for thermal detectors. These factors combine to permit the invention to be embodied in simple structures. The use of simple structures leads to cost reductions in the fabrication process, Second, the present invention offers fast response times that have previously been found only in cooled photon detectors (thermal detectors cannot compete with the optomechanical photon detector on the basis of response time). The invention is capable of sub-nanosecond response times, which is faster than other photon detectors. Third, the strain read-out from the optomechanical photo detector can be relatively simple thus reducing the cost by simplifying the fabrication process compared to conventional photoconductivity based photon detectors. Fourth, the invention can easily be miniaturized. Fifth, low cost versions of the invention can be implemented since the pixel structure will be substantially simplified compared to conventional photon or thermal detectors. Sixth, the invention is more sensitive than conventional thermal detectors.

Finally, the invention permits multicolor infrared detection to be achieved using an inherently simple approach. Since the multicolor detector pixel can be small, multidimensional arrays can be made. Further, such arrays can easily be miniaturized. Low cost versions can readily be reduced-to-practice due to the inherent simplicity of the multicolor infrared pixel.

All the disclosed embodiments of the invention described herein can be realized and practiced without undue experimentation. Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that the invention may be practiced otherwise than as described herein.

For example, the individual components need not be formed in the disclosed shapes, or assembled in the disclosed configuration, but could be provided in virtually any shape, and assembled in virtually any configuration. In addition to the alternate mechanical applications suggested above, structures that are different than the microcantilevers and circular plate illustrated in the drawings are also possible. It should be noted that there are many other structures that can be deflected by this bandgap dependent effect and be subsequently measured.

As another example, the individual components need not be fabricated from the disclosed materials, but could be fabricated from virtually any suitable materials. Further, although the infrared detector described herein is a physically separate module, it will be manifest that the infrared detector may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It is intended that the appended claims cover all such additions, modifications and rearrangements. Expedient embodiments of the present invention are differentiated by the appended subclaims.

REFERENCES

1. T. Figielski, "Photostriction Effect in Germanium," *Phys. Status Solidi* 1, pages 306–316 (1961).
2. R. G. Stearns and G. S. Kino, "Effect of electronic strain on photoacoustic generation in silicon," *Appl. Phys. Lett.* 47, pages 1048–1050 (1985).
3. P. Hess and A.C. Boccara, *Photoacoustic, Photothermal and Photochemical Processes at Surfaces and in Thin Films* (Springer-Verlag, Berlin 1989).
4. F. J. von Preissing, "Applicability of the classical curvature-stress relation for thin films on plate substrates," *J. Apl. Phys.* 66, page 4262 (1989).
5. P. G. Datskos, P. I. Oden, T. Thundat, E. A. Wachter, R. J. Warmack, and S. R. Hunter, "Remote infrared radiation detection using piezoresistive microcantilevers," *App. Phys. Lett.* 69, page 2986 (Sep. 17, 1996).
6. Richard C. Dorf et al. eds., *The electrical Engineering Handbook*, CRC Press, (1993).
7. Michael Bass et al. eds., *Handbook of Optics, Volumes I–II*, $2^{nd}$ ed., McGraw Hill Inc. (1995).
8. Eugene A. Avallone et al. eds., *Marks Mechanical Engineering Handbook*, $10^{th}$ ed., McGraw Hill (1996).

What is claimed is:

1. An apparatus, comprising:
    a first optomechanical detector, said first optomechanical detector I) absorbing a high frequency portion of a first spectral signal and II) passing a low frequency portion of said first spectral signal, said low frequency portion of said first spectral signal defining a second spectral signal; and
    a second detector optically coupled to said first optomechanical detector, said second detector absorbing an upper frequency portion of said second spectral signal.
2. The apparatus of claim 1, further comprising a third detector optically coupled to said second detector, wherein I) said second detector passes a lower frequency portion of said second spectral signal, said lower frequency portion of said second spectral signal defining a third spectral signal and II) said third detector absorbs at least a portion of said third spectral signal.
3. The apparatus of claim 1, wherein said first optomechanical detector includes a first optomechanical photon detector that includes a semiconductor material that exhibits photoinduced lattice strain.
4. The apparatus of claim 3, wherein said first optomechanical photon detector includes an optical strain measurement circuit.
5. The apparatus of claim 3, wherein said first optomechanical photon detector includes a capacitive measurement circuit.
6. The apparatus of claim 3, wherein said first optomechanical photon detector includes an electron tunneling measurement circuit.
7. The apparatus of claim 3, wherein said first optomechanical photon detector includes a piezoresistive measurement circuit.
8. The apparatus of claim 3, wherein said second detector comprises a second optomechanical detector.
9. The apparatus of claim 3, wherein said semiconductor material is selected from the group consisting of crystalline silicon and amorphous silicon.
10. The apparatus of claim 1, further comprising an electronically activated shutter coupled to said first optomechanical detector.
11. The apparatus of claim 1, wherein said first optomechanical detector includes a first optomechanical thermal detector.
12. The apparatus of claim 1, wherein said second detector includes a photon absorptive layer.
13. The apparatus of claim 1, wherein said second detector comprises a second optomechanical detector.
14. The apparatus of claim 1, wherein there is no cooling subsystem.
15. The apparatus of claim 1, further comprising a junction detector coupled to said first optomechanical detector.
16. The apparatus of claim 15 wherein said junction detector is selected from the group consisting of a metal-semiconductor junction and a PN junction.
17. A method, comprising:
    absorbing a high frequency portion of a first spectral signal with a first optomechanical detector;
    passing a low frequency portion of said first spectral signal through said first optomechanical detector, said low frequency portion defining a second spectral signal; and then
    absorbing an upper frequency portion of said second spectral signal with a second detector.
18. The method of claim 17, further comprising:
    passing a lower frequency portion of said second spectral signal through said second detector, said lower frequency portion of said second spectral signal defining a third spectral signal; and
    absorbing at least a portion of said third spectral signal with a third detector.
19. The method of claim 17, wherein absorbing said high frequency portion of said first spectral signal includes absorbing said high frequency portion with a first optomechanical photon detector.

20. The method of claim 17, further comprising measuring strain in said first optomechanical photon detector with an optical circuit.

21. The method of claim 17, further comprising measuring strain in said first optomechanical photon detector with a capacitive circuit.

22. The method of claim 17, further comprising measuring strain in said first optomechanical photon detector with a piezoresistive circuit.

23. The method of claim 17, further comprising measuring strain in said first optomechanical photon detector with a tunneling circuit.

24. The method of claim 17, wherein absorbing said high frequency portion of said first spectral signal includes opening an electronically activated shutter that is coupled to said first optomechanical photon detector.

25. The method of claim 17, wherein absorbing said upper frequency portion of said second spectral signal includes absorbing said upper frequency portion with a second optomechanical photon detector.

26. The method of claim 17, wherein absorbing said upper frequency portion of said second spectral signal includes absorbing said upper frequency portion with an optomechanical thermal detector.

27. The method of claim 17, wherein absorbing said high frequency portion of said first spectral signal includes absorbing said high frequency portion with a first optomechanical thermal detector.

28. The method of claim 27, wherein absorbing said upper frequency portion of said second spectral signal includes absorbing said second spectral signal with a second optomechanical thermal detector.

29. The method of claim 17, further comprising absorbing photons with a junction detector before absorbing said high frequency portion.

30. An optomechanical photon detector apparatus comprising a semiconductor material that deforms as a result of lattice strain resulting from photons creating electron/hole pairs throughout substantially the entire semiconductor material.

31. The apparatus of claim 30, further comprising an electronically activated shutter coupled to said optomechanical photon detector.

32. The apparatus of claim 30, wherein said optomechanical photon detector includes a strain measuring circuit.

33. The apparatus of claim 30, wherein said optomechanical photon detector includes a capacitance measuring circuit.

34. The apparatus of claim 30, wherein said optomechanical photon detector includes a tunneling measuring circuit.

35. The apparatus of claim 30, wherein said optomechanical photon detector includes a piezoresistive measuring circuit.

36. The apparatus of claim 30, wherein there is no cooling subsystem.

37. The apparatus of claim 30, further comprising a junction detector coupled to said optomechanical photon detector.

38. The apparatus of claim 30, wherein said junction detector is selected from the group consisting of a metal-semiconductor junction and a PN junction.

39. The apparatus of claim 30, wherein said semiconductor material is selected from the group consisting of crystalline silicon and amorphous silicon.

40. The photon detector apparatus of claim 30, wherein said semiconductor material is formed into a film, and wherein said film is bonded to a substrate.

41. A method of detecting photons with an optomechanical photon detector, comprising the steps of:

directing photons onto a semiconductor material of said optomechanical photon detector that deforms as a result of lattice strain resulting from photons creating electron/hole pairs throughout substantially the entire semiconductor material; and measuring a change in a physical parameter of said semiconductor material which occurs as a result of said lattice strain.

42. The method of claim 41, wherein the step of directing photons includes the step of opening an electronically activated shutter that is coupled to said optomechanical photon detector.

43. The method of claim 41, wherein said step of measuring a change in a physical parameter of said semiconductor material includes the step of measuring strain in said optomechanical photon detector with an optical circuit.

44. The method of claim 41, wherein said step of measuring a change in a physical parameter of said semiconductor material includes the step of measuring strain in said optomechanical photon detector with a capacitance circuit.

45. The method of claim 44, wherein said step of measuring a change in a physical parameter of said semiconductor material includes the step of measuring strain in said optomechanical photon detector with a tunneling circuit.

46. The method of claim 41, wherein said step of measuring a change in a physical parameter of said semiconductor material includes the step of measuring strain in said optomechanical photon detector with a piezoresistive circuit.

47. The method of claim 41, further comprising a step of detecting photons with a junction detector before the step of detecting photons with said optomechanical photon detector.

48. An apparatus comprising:

a junction detector; and an optomechanical thermal detector coupled to said junction detector.

49. The apparatus of claim 48, wherein said junction detector is selected from the group consisting of a metal-semiconductor junction and a PN junction.

50. A method comprising:

absorbing a high frequency portion of a first spectral signal with a junction detector;

passing a low frequency portion of said first spectral signal through said junction detector, said low frequency portion defining a second spectral signal; and then absorbing an upper frequency portion of said second spectral signal with an optomechanical thermal detector.

51. An optomechanical photon detector for detecting photons having a given energy, comprising a semiconductor material having a band gap energy which is lower than said energy of said photons being detected.

52. The apparatus of claim 51, further comprising an electronically activated shutter coupled to said optomechanical photon detector.

53. The apparatus of claim 51, wherein said optomechanical photon detector includes a strain measuring circuit.

54. The apparatus of claim 51, wherein said optomechanical photon detector includes a capacitance measuring circuit.

55. The apparatus of claim 51, wherein said optomechanical photon detector includes a tunneling measuring circuit.

56. The apparatus of claim 51, wherein said optomechanical photon detector includes a piezoresistive measuring circuit.

57. The apparatus of claim 51, further comprising a junction detector coupled to said optomechanical photon detector.

58. The apparatus of claim 51, wherein said junction detector is selected from the group consisting of a metal-semiconductor junction and a PN junction.

59. The photon detector apparatus of claim 51, wherein said semiconductor material is formed into a film, and wherein said film is bonded to a substrate.

\* \* \* \* \*